US012763808B2

(12) United States Patent
Wang

(10) Patent No.: US 12,763,808 B2
(45) Date of Patent: Oct. 13, 2026

(54) CASE WITH A BRACKET FOR MOBILE PHONE

(71) Applicant: Feng Wang, Shenzhen (CN)

(72) Inventor: Feng Wang, Shenzhen (CN)

( * ) Notice: Subject to any disclaimer, the term of this patent is extended or adjusted under 35 U.S.C. 154(b) by 331 days.

(21) Appl. No.: 18/527,357

(22) Filed: Dec. 3, 2023

(65) Prior Publication Data

US 2025/0183934 A1 Jun. 5, 2025

(51) Int. Cl.
*H04B 1/3888* (2015.01)
*H04M 1/04* (2006.01)

(52) U.S. Cl.
CPC ........... *H04B 1/3888* (2013.01); *H04M 1/04* (2013.01)

(58) Field of Classification Search
CPC ............................... H04B 1/3888; H04M 1/04
See application file for complete search history.

(56) References Cited

U.S. PATENT DOCUMENTS 10,554,799 B2 * 2/2020 Lee ...................... H04B 1/3888
2018/0316380 A1 * 11/2018 Buffin ...................... A45F 5/00
2020/0367632 A1 * 11/2020 Friedman ............... A45C 11/00
2022/0094379 A1 * 3/2022 Balderston ............ A45F 5/1516
2023/0179249 A1 * 6/2023 Wang .................. H04B 1/3877 455/575.8
2023/0412715 A1 * 12/2023 Marks .................. H04B 1/3877

* cited by examiner

*Primary Examiner* — David Bilodeau
(74) *Attorney, Agent, or Firm* — Jose Cherson Weissbrot

(57) ABSTRACT

The present disclosure provides a case with a bracket for mobile phone, which comprises a mobile phone case main body, a bracket, a fixing assembly and a torsion element; the mobile phone case main body is provided with the fixing assembly, which is connected to the bracket through the torsion element, wherein the torsion element is composed of multiple hook spring pieces spliced side by side, wherein one end of the multiple hook spring pieces is clamped onto a rotating shaft set at one end of the bracket, and the other end of the multiple hook spring pieces is connected to the fixing assembly. The present disclosure can disperse concentrated stress and improve structural strength through the cooperation of multiple hook spring pieces. Therefore, the present disclosure can achieve the function of a mobile phone bracket, and the structure of the torsion element in the present disclosure is simple, which is conducive to large-scale production.

9 Claims, 4 Drawing Sheets

CASE WITH A BRACKET FOR MOBILE PHONE

TECHNICAL FIELD OF THE INVENTION

The present disclosure relates to the technical field of mobile phone case, specifically relates to a case with a bracket for mobile phone.

BACKGROUND OF THE INVENTION

Nowadays, all aspects of our lives are inseparable from mobile phones. The frequency of using mobile phones is increasing, and the chance of damage to mobile phones is also increasing. In order to protect their mobile phones, many people now install mobile phone cases with protective functions on their mobile phones. At the same time, due to the development of mobile technology, people are increasingly using their mobile phones to watch videos or read. At this time, how to fix their mobile phones has become a big problem. Therefore, in order to fix the mobile phone on the desktop and achieve the support function, everyone adds a bracket to the mobile phone case.

At present, the structure of the related case with a bracket for mobile phone is a bit simple and not stable enough, and it cannot be supported well during use; and the structure of some brackets is too complicated, which is not conducive to mass production. At the same time, with the increasing popularity of wireless charging, many people add magnetic suction components to the mobile phone case, and adding brackets to the mobile phone case becomes more difficult.

SUMMARY OF THE INVENTION

In order to solve the problem of unstable support of a bracket on an existing mobile phone case, the present disclosure provides a case with a bracket for mobile phone, which comprises a mobile phone case main body, a bracket, a fixing assembly and a torsion element. The mobile phone case main body is provided with a fixing assembly, which is connected to the bracket through the torsion element, wherein the torsion element is composed of multiple hook spring pieces spliced side by side, wherein one end of the multiple hook spring pieces is clamped onto a rotating shaft set at one end of the bracket, and the other end of the multiple hook spring pieces is connected to the fixing assembly.

By adopting the above mentioned technical solution, multiple hook spring pieces are connected to the rotating shaft at one end. When the rotating shaft rotates, the multiple hook spring pieces will bite the rotating shaft and apply resistance force, thus enabling the bracket to be firmly fixed, fulfilling the function of the bracket with a very simple structure. The fixing assembly can ensure that multiple hook spring pieces are fixed on the mobile phone case, ensuring the stable implementation of the support function of the multiple hook spring pieces. Through the cooperation of multiple hook spring pieces, it can disperse concentrated stress and improve structural strength. Therefore, the present disclosure can achieve the function of a mobile phone bracket, and the structure of the torsion element in the present disclosure is simple, which is conducive to large-scale production.

Optionally, the fixing assembly includes a first fixing piece and a second fixing piece. The outer back surface of the mobile phone case main body is provided with a first installation slot, and the inner back surface of the mobile phone case main body is provided with a second installation slot. The first fixing piece is arranged in the first installation slot, and the second fixing piece is arranged in the second installation slot. The first fixing piece and the second fixing piece are detachably connected to each other.

By adopting the above mentioned technical solution, the first and second fixing pieces are respectively arranged in the first and second installation slots, and can be firmly connected to the mobile phone case main body. The first fixing piece and the second fixing piece are detachably connected to each other, making it easy for users to replace components and also facilitate disassembly and maintenance.

Optionally, the second fixing piece is provided with several connecting holes, and the mobile phone case main body between the first and second installation slots is correspondingly provided with several through holes. The first fixing piece is provided with several protrusions, which are connected with the connecting holes through the through holes by snap connection.

By adopting the above mentioned technical solution, the second fixing piece is provided with several connecting holes, and the first fixing piece is provided with several protrusions, which can be matched and combined to achieve tight snap connection. There is a mobile phone case main body between the first installation slot and the second installation slot, and there are several through holes on the mobile phone case main body, so that the protrusions can pass through several through holes and connect with several connecting holes, so that the first and second fixing pieces can be fixed on the mobile phone case.

Optionally, the second fixing piece is provided with an installation hole, and the other end of the multiple hook spring pieces is provided with a protruding structure, which is connected to the installation hole of the second fixing piece.

Optionally, the protruding structure is a hooking part, and the hooking part is at least partially embedded in the installation hole.

By adopting the above mentioned technical solution, the other end of the torsion element is fixed in the installation hole of the second fixing piece, which can ensure that the torsion element is stably fixed on the mobile phone case and will not shift when one end of the torsion element is twisted. When the bracket drives the rotating shaft to rotate, it can drive the torsion element to bite the rotating shaft tightly, thereby achieving the function of fixing the bracket.

Optionally, the second installation slot is also provided with a cover, which can be detachably connected to the inner surface of the mobile phone case main body.

By adopting the above mentioned technical solution, the cover is installed in the second installation slot. Firstly, it can cover the metal parts, making the mobile phone case more beautiful overall. Secondly, using the cover can prevent metal parts from damaging the mobile phone case. At the same time, there is a detachable connection between the cover and the mobile phone case main body, making it easy to replace and repair parts.

Optionally, the bracket is provided with an upper cover body and a lower cover body, which can be detachably connected to each other. The upper cover body is provided with a receiving slot, and magnetic components are arranged in the receiving slot.

By adopting the above mentioned technical solution, the upper cover body and the lower cover body are tightly fitted to form a bracket, and the receiving slot can accommodate magnetic components, achieving the function of magnetic attraction. At the same time, both are set as detachable connections, allowing users to easily remove the magnetic components and use them as non magnetic brackets.

Optionally, the bracket is provided with two fixing protrusions at the connection of the bracket and the rotating shaft, and the rotating shaft is arranged in the two fixing protrusions by passing through the two fixing protrusions to rotatably connect with the mobile phone case main body. The rotating shaft can be inserted in them through a through hole to achieve the function of the bracket rotating relative to the torsion element.

Optionally, the outer back surface of the mobile phone case main body is provided with a storage slot, and the bracket is arranged in the storage slot. When the bracket is not needed, it can be placed in the storage slot without affecting the normal use of the mobile phone.

Optionally, the storage slot is provided with an empty slot on the side, and an opening is provided on the bracket arranged opposite to the empty slot to match the empty slot and provide space for easy opening of the bracket. There is an empty slot next to the storage slot, which helps users take out the bracket from the storage slot. A finger can be placed into the empty slot, and by tapping the opening on the bracket, the bracket can be successfully removed from the storage slot.

In summary, this disclosure includes at least one of the following advantageous effects:

(1) Multiple hook spring pieces are connected to the rotating shaft at one end, and when the rotating shaft rotates, the multiple hook spring pieces will bite the rotating shaft and apply resistance force, enabling the bracket to be firmly fixed, completing the function of the bracket with a very simple structure. The fixing assembly ensures that multiple hook spring pieces are fixed on the mobile phone case, ensuring the stable implementation of the support functions of the multiple hook spring pieces. Therefore, the present disclosure can achieve the function of a mobile phone bracket, and the structure of the torsion element in the present disclosure is simple, which is more conducive to large-scale production.

(2) The first fixing piece and the second fixing piece are respectively arranged in the first and second installation slots, enabling the fixing pieces to be firmly connected to the mobile phone case main body. The first fixing piece and the second fixing piece are detachable connected to each other, making it convenient for users to replace accessories and for the disassembly and maintenance of the mobile phone case.

Explanation of the reference signs: 1. Mobile phone case main body; 1-1. Outer back surface; 1-2. Inner back surface; 11. First installation slot; 12. Second installation slot; 13. Storage slot; 131. Empty slot; 2. Fixing assembly; 21. First fixing piece; 22. Second fixing piece; 3. Bracket; 31. Upper cover body; 32. Lower cover body; 33. Magnetic components; 4. Torsion element; 401. Hook spring piece; 5. Rotating shaft; 6. Cover.

DETAILED DESCRIPTION OF THE PREFERRED EMBODIMENT

The following is a description of the present disclosure based on embodiments, but it is worth noting that the present disclosure is not limited to these embodiments. In the following detailed description of this disclosure, specific details are described in detail. However, for those parts that are not fully described, those skilled in the art can fully understand the present disclosure.

In addition, those skilled in the art should understand that the accompanying drawings are provided only to illustrate the purposes, features and advantages of the present disclosure and the accompanying drawings are not actually drawn to scale.

At the same time, unless explicitly required by the context, similar words such as "comprising" and "including" in the entire specification and claims should be interpreted as inclusive rather than exclusive or exhaustive; That is to say, it means "including but not limited to". The following is a further detailed explanation of this disclosure in conjunction with FIGS. 1-5.

Figure 1:
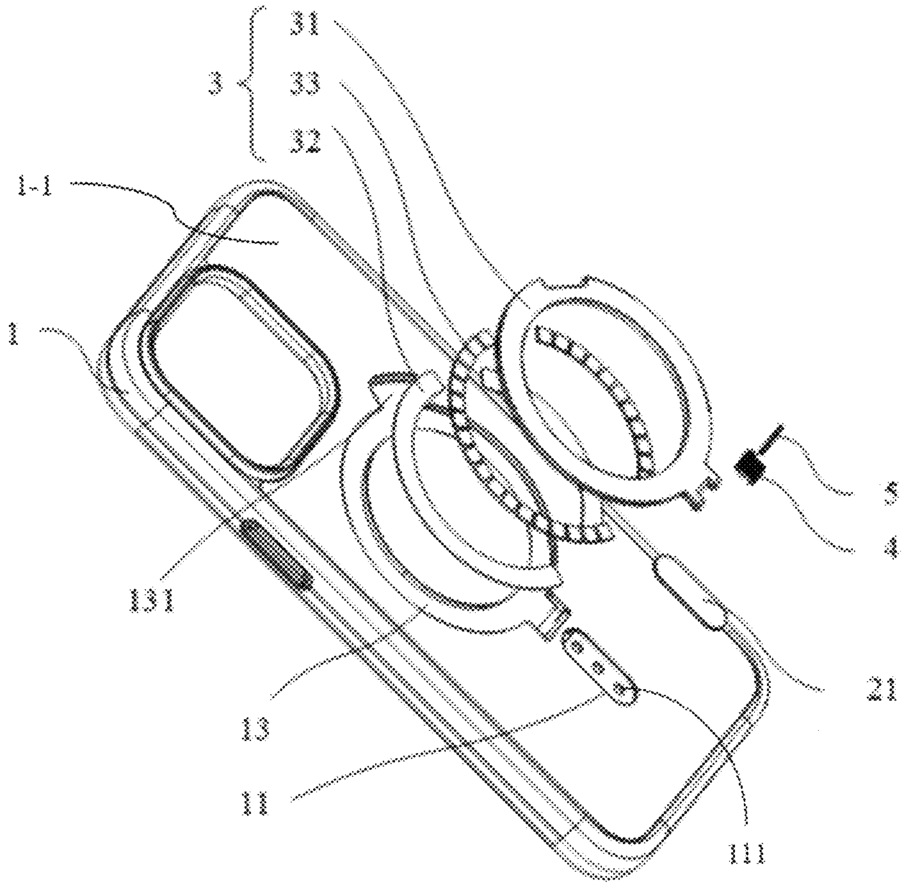
FIG. 1 is an exploded view of the outer back surface of the case with a bracket for mobile phone in an embodiment of the present disclosure.
Figure 6:
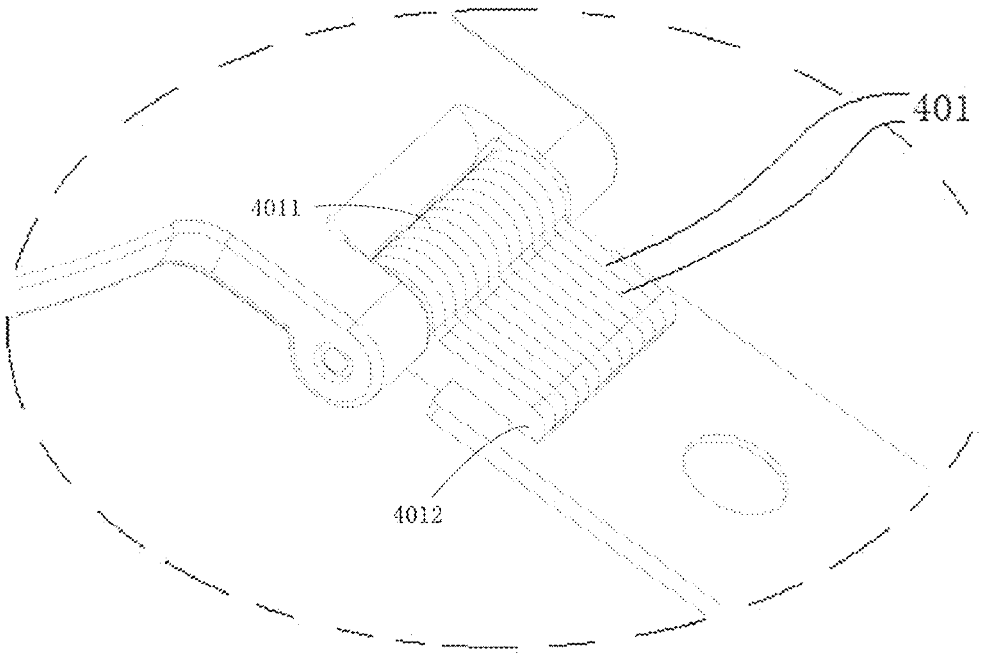
FIG. 6 is a structural schematic view of the torsion element in an embodiment of the present disclosure.

This embodiment discloses a case with a bracket for mobile phone, which is used to achieve a stable mobile phone bracket function, and the production process is simple and suitable for large-scale production. Referring to FIGS. 1 and 6, it includes the mobile phone case main body 1, fixing assembly 2, bracket 3, torsion element 4 and rotating shaft 5. The fixing assembly 2 is installed on the mobile phone case main body 1, and one end of the torsion element 4 is connected to the fixing assembly 2 and the other end thereof connected to the rotating shaft 5, achieving the function of fixing the bracket 3 in the required position. The rotating shaft 5 is connected to the bracket 3 to achieve the function of bracket rotation. The combination of torsion element 4 and rotating shaft 5 mainly achieves the function of rotation fixation. Rotating shaft 5 is driven by the rotation of bracket 3 to rotate together. During the rotation of the rotating shaft 5, it will cause torsion element 4 to deform and tighten inward. At this time, the torsion element 4 will tightly bite the rotating shaft 5, allowing the rotating shaft 5 to be fixed at a certain angle; in addition, with the bracket 3 connected to the rotating shaft 5, the function of the mobile phone bracket can be achieved. The torsion element 4 is formed by splicing multiple hook spring pieces 401 side by side, wherein one end of the multiple hook spring pieces 401 is clamped to the rotating shaft 5 set at one end of the bracket, and the other end of the multiple hook spring pieces 401 is connected to the fixing assembly. Through the cooperation of each of the above components, a case with a bracket for mobile phone can be achieved.

Figure 2:
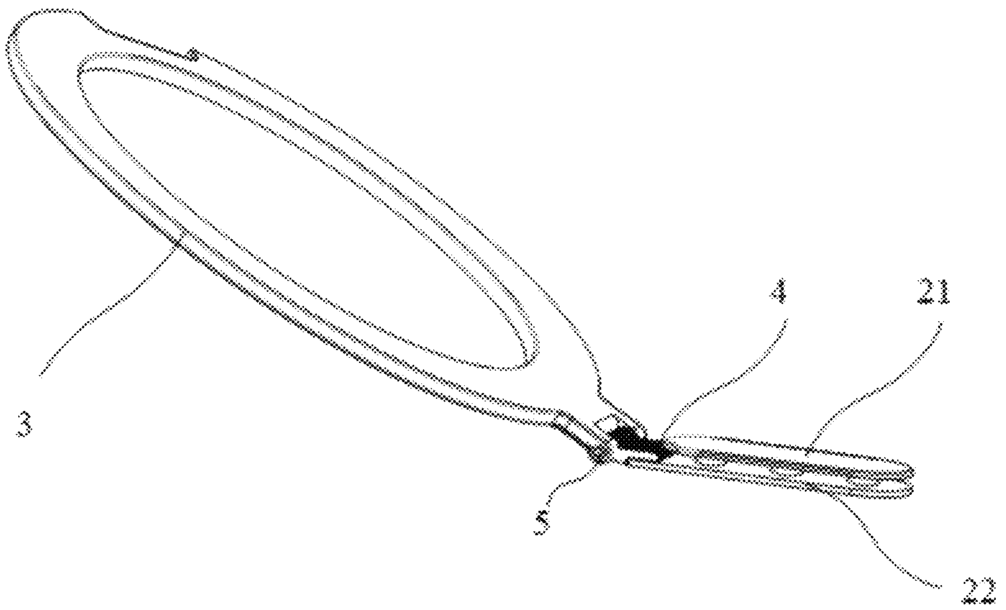
FIG. 2 is an exploded view of the inner back surface of the case with a bracket for mobile phone in an embodiment of the present disclosure.

Referring to FIGS. 1 and 2, an outer back surface 1-1 of the mobile phone case main body 1 is provided with a first installation slot 11 and the inner back surface 1-2 of the mobile phone case main body 1 is provided with a second installation slot 12, a second fixing piece 22 is arranged in the second installation slot 12, and a cover 6 is arranged on the outside of the second installation slot 12, which can cover the second fixing piece 22. Through this design, the inner back surface of the mobile phone case can be more beautiful, and it can also prevent the second fixing piece 22 from damaging the mobile phone placed inside the mobile phone case. At the same time, the cover 6 is detachable and can be used in conjunction with the removal of the fixing assembly 2 to facilitate the realisation of maintenance and replacement.

Figure 3:
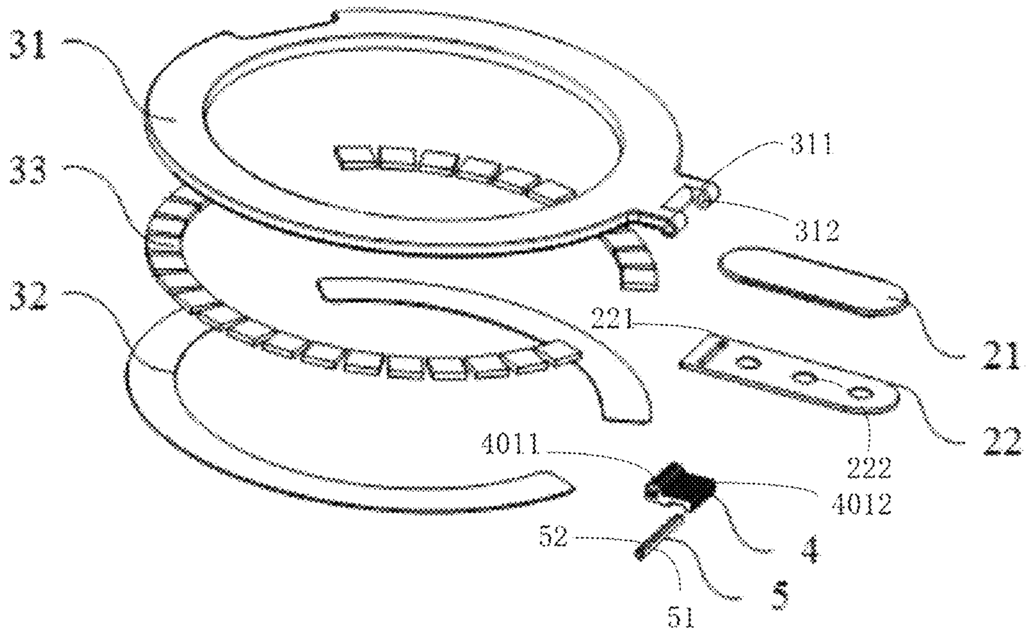
FIG. 3 is a schematic view of the connection of the bracket, the rotating shaft, the torsion element and the fixing assembly in an embodiment of the present disclosure.
Figure 4:
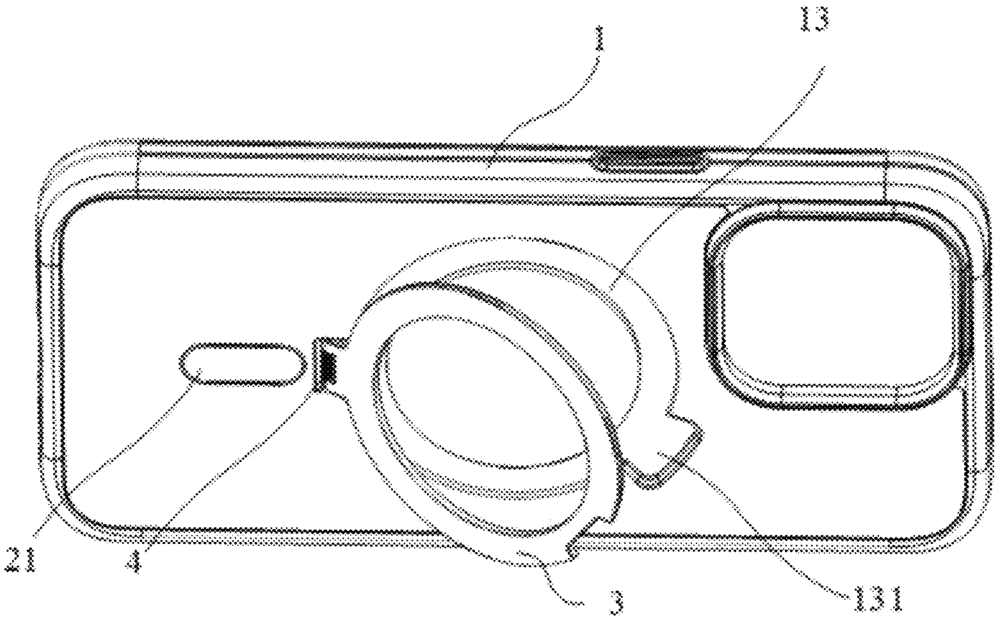
FIG. 4 is an exploded view of the bracket, the rotating shaft, the torsion element and the fixing assembly in an embodiment of the present disclosure.

Referring to FIGS. 3 and 4, the fixing assembly 2 includes a first fixing piece 21 and a second fixing piece 22. The first fixing piece 21 is arranged in the first installation slot 11, and the second fixing piece 22 is arranged in the second installation slot 12. The second fixing piece 22 is provided with several connecting holes 222, and the second fixing piece 22 or the first fixing piece 21 is provided with several protrusions. The connecting holes 222 correspond to the protrusions and can be mutually buckled and snapped together. There is a mobile phone case main body 1 between the first installation slot 11 and the second installation slot 12 and the mobile phone case main body 1 is provided with several through holes 111, and the protrusions pass through the through holes to snapped connect with the connecting holes 222. At this time, the first fixing piece 21, the mobile phone case main body 1 and the second fixing piece 22 are tightly connected together, enabling the bracket to be firmly connected to the mobile phone case main body 1.

Referring to FIGS. 3 and 4, one end of the torsion element 4 is connected to the second fixing piece 22, and the other end is clamped on the rotating shaft 5. The rotating shaft 5 is divided into a contact surface 51 and a non-contact surface 52. The contact surface 51 is cylindrical, and the non-contact surface 52 is planar. The structure of the rotating shaft 5 can effectively ensure that the rotation of the rotating shaft can drive the deformation of the torsion element 4. When the rotating shaft 5 rotates, the torsion element 4 bites the rotating shaft 5 and applies damping force, so that the bracket 3 can be fixed at a certain angle, and it will not rebound, achieving the support function of the mobile phone bracket. The angle between the contact surface 51 and the non-contact surface 52 of the rotating shaft 5 relative to the center will result in different rotation angles of the rotating shaft 5. In one of the design schemes of the rotating shaft 5, it is used to support the mobile phone case horizontally at a maximum angle of 71.5° and vertically at a maximum angle of 78.5°. When the rotation angle of the rotating shaft 5 is greater than the maximum angle, the torsion element 4 and the rotating shaft 5 will not be able to maintain balance, causing the rotating shaft 5 to rebound.

Referring to FIG. 4, the bracket 3 includes an upper cover body 31, a lower cover body 32 and a magnetic component 33. The upper cover body 31 is provided with a receiving slot, and the magnetic component 33 is placed in the receiving slot. The lower cover body 32 is detachable connected to the upper cover body 31. When the three are installed together, they can be used as magnetic suction components and can be used in conjunction with a wireless charger with magnetic suction function for wireless charging. Users can freely customize their usage scenarios because the lower cover body 32 and the upper cover body 31 are connected in a detachable manner, allowing users to easily remove the magnetic component 33 so as to not use the magnetic suction function. The upper cover body 31 is provided with two fixing protrusions 311, which are internally provided with through holes 312. The rotating shaft 5 passes through the through holes 312 and is connected to the upper cover body 31, achieving the function of the bracket 3 rotating around the rotating shaft 5. Among them, the magnetic component can be a magnet.

As shown in FIGS. 4 and 6, the torsion element 4 is composed of multiple hook spring pieces 401 that are spliced side by side. One end of the hook spring pieces 401 has a clamping part 4011, which is clamped to the contact surface 51 of the rotating shaft 5 to achieve rotation on the rotating shaft 5; The other end of the hook spring pieces 401 is provided with a hooking part 4012, which can be hooked into the installation hole 221 set on the second fixing piece 22. Due to the fixation of the other end of the hook spring piece 401, the deformation of the hook spring piece 401 is only caused when the bracket 3 rotates around the rotating shaft 5, thereby achieving the tension generated by the hook spring piece 401 when the bracket 3 rotates to any angle for fixation, thereby achieving stable fixation at any angle.

Figure 5:
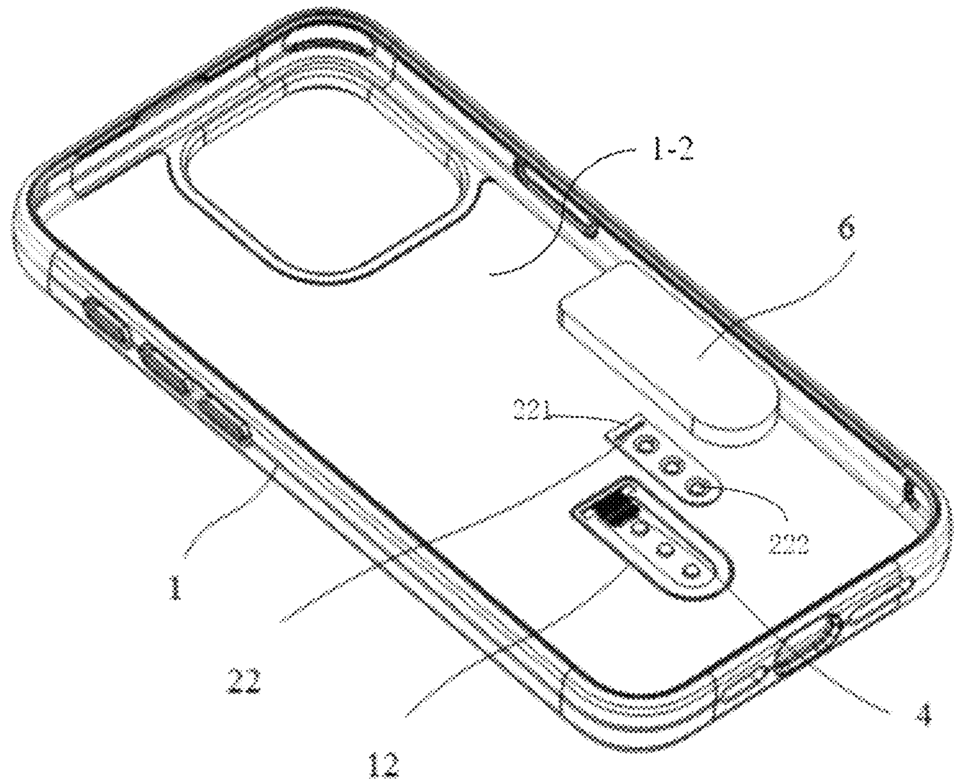
FIG. 5 is a schematic view of the mobile phone case placed horizontally in an embodiment of the present disclosure, where the bracket is opened.

Referring to FIG. 5, the mobile phone case main body 1 is provided with a storage slot 13. When the mobile phone bracket 3 is not in use, the bracket 3 can be stored in the storage slot 13 without affecting normal mobile phone use. If the storage slot 13 is set to completely match the shape of the bracket 3, it can improve the relevant user experience. The storage slot 13 is provided with an empty slot 131 on the side. In this embodiment, an empty slot 131 is arranged on the side, and the bracket 3 is provided with an opening at the position of the empty slot 131. When the mobile phone bracket 3 needs to be removed from the storage slot 13, the empty slot 131 provides corresponding gaps, and users can easily pull the bracket 3 out through the empty slot 131.

The implementation principle of a case with a bracket for mobile phone in an embodiment of the present disclosure is as follows:

When using mobile phone bracket 3, remove it from the storage slot 13 through the empty slot 131 on the mobile phone case main body 1. Then, rotate the mobile phone bracket 3 to the desired position. During this process, the mobile phone bracket 3 drives the rotating shaft 5 to rotate, and the rotating shaft 5 drives the torsion element 4 to deform. The deformation of the torsion element 4 will cause the torsion piece to bite the rotating shaft 5 and apply damping force, so that the bracket 3 can be fixed at a certain angle, which can achieve the function of a mobile phone bracket. At the same time, the structure of the torsion element 4 is very simple and can achieve large-scale production. Specifically, the torsion element 4 is composed of multiple hook spring pieces 401 spliced side by side, and the number of hook spring pieces 401 can be determined based on the product size. By the cooperation of multiple hook spring pieces 401, the concentrated stress can be dispersed and the structural strength can be improved. The bracket 3 is internally provided with a detachable magnet. When the magnet is installed, the mobile phone case has a magnetic suction function and can be applied to the field of wireless charging.

The above are all preferred embodiments of this disclosure and are not intended to limit the scope of protection of this disclosure. Therefore, any equivalent changes made based on the structure, shape, and principle of this disclosure should be covered within the scope of protection of this disclosure.

What is claimed is:

1. A case with a bracket for mobile phone, it the case comprises a mobile phone case main body, a bracket, a fixing assembly and a torsion element; the mobile phone case main body is provided with the fixing assembly, which is connected to the bracket through the torsion element, wherein the torsion element is composed of multiple hook spring pieces spliced side by side, wherein one end of each hook spring piece is clamped onto a rotating shaft set at one end of the bracket, and the other end of each hook spring piece is connected to the fixing assembly;

wherein the fixing assembly includes a first fixing piece and a second fixing piece; an outer back surface of the mobile phone case main body is provided with a first installation slot, and an inner back surface of the mobile phone case main body is provided with a second installation slot; the first fixing piece is arranged in the first installation slot, and the second fixing piece is arranged in the second installation slot; the first fixing piece and the second fixing piece are detachably connected to each other.

2. The case with a bracket for mobile phone according to claim 1, wherein the second fixing piece is provided with several connecting holes, and the mobile phone case main body between the first installation slot and second installation slot is correspondingly provided with several through holes; the first fixing piece is provided with several protrusions, which pass through the through holes and connected with the connecting holes.

3. The case with a bracket for mobile phone according to claim 2, wherein the second fixing piece is provided with an installation hole, and the other end of each hook spring piece is provided with a protruding structure, which is connected to the installation hole of the second fixing piece.

4. The case with a bracket for mobile phone according to claim 3, wherein the protruding structure is a hooking part, and the hooking part is at least partially embedded in the installation hole.

5. The case with a bracket for mobile phone according to claim 1, wherein the second installation slot is also provided with a cover, which can be detachably connected to the inner surface of the mobile phone case main body.

6. The case with a bracket for mobile phone according to claim 1, wherein the bracket is provided with an upper cover body and a lower cover body, which can be detachably connected to each other; and a magnetic component is arranged in the upper cover body.

7. The case with a bracket for mobile phone according to claim 1, wherein the bracket is provided with two fixing protrusions at the connection of the bracket and the rotating shaft, and the rotating shaft is arranged in the two fixing protrusions by passing through the two fixing protrusions to rotatably connect with the mobile phone case main body.

8. The case with a bracket for mobile phone according to claim 1, wherein the outer back surface of the mobile phone case main body is provided with a storage slot, and the bracket can be stored in the storage slot.

9. The case with a bracket for mobile phone according to claim 8, wherein the storage slot is provided with an empty slot on the side, and an opening is provided on the bracket arranged opposite to the empty slot to match the empty slot and provide space for easy opening of the bracket.

* * * * *